July 19, 1966 W. R. JOHNSON ETAL 3,262,124
TRANSDUCING SYSTEM
Filed July 24, 1962 2 Sheets-Sheet 2
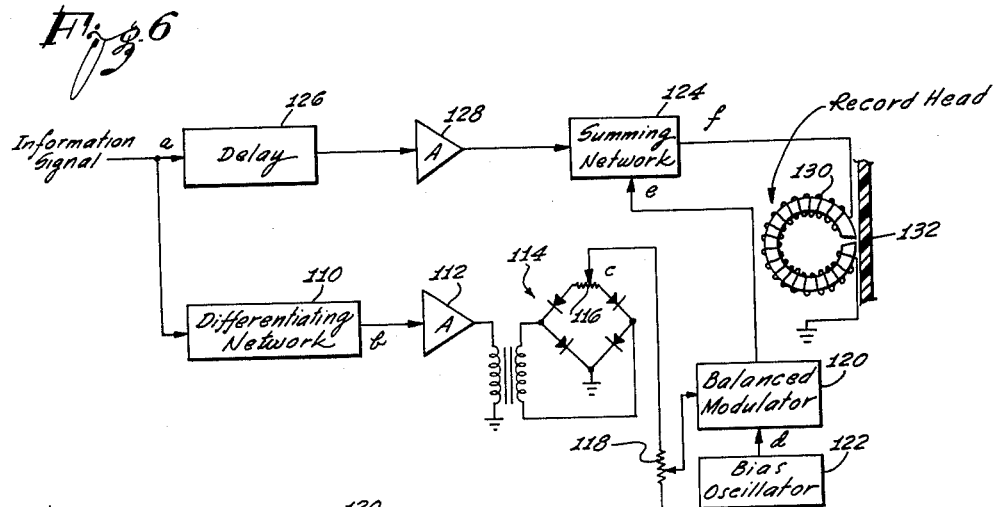
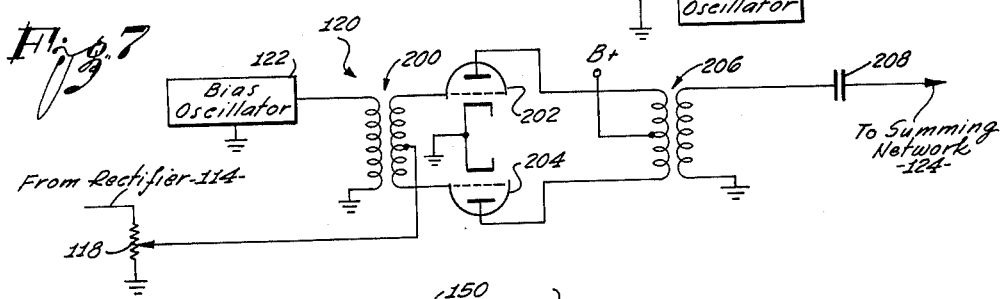
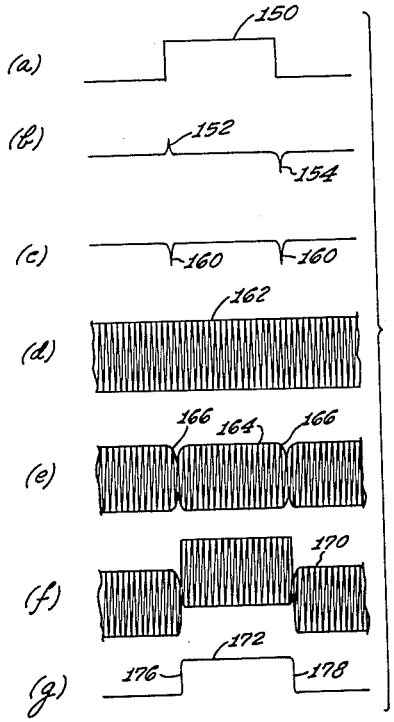
INVENTORS:
Wayne R. Johnson
Richard V. Roelofs
Attorneys United States Patent Office 3,262,124
Patented July 19, 1966

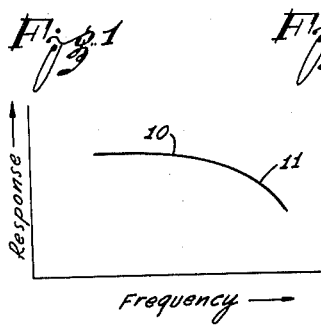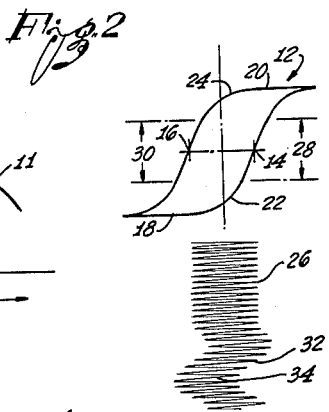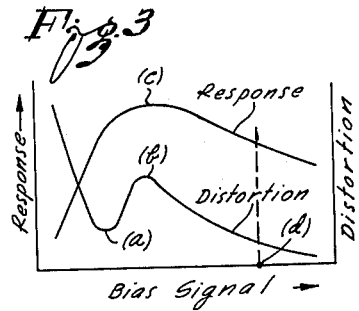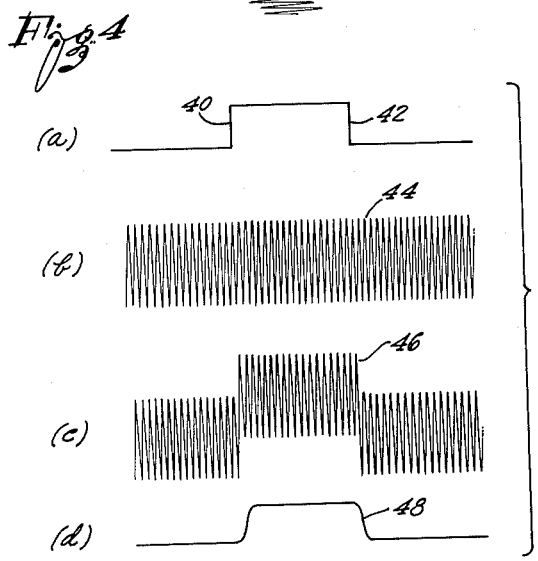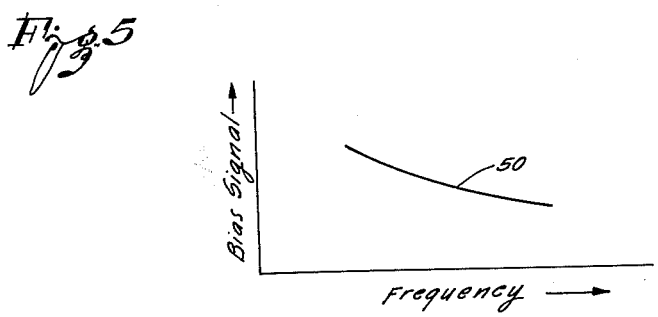

3,262,124
TRANSDUCING SYSTEM
Wayne R. Johnson, Los Angeles, and Richard V. Roelofs, Granada Hills, Calif., assignors to Minnesota Mining and Manufacturing Company, St. Paul, Minn., a corporation of Delaware
Filed July 24, 1962, Ser. No. 212,071
5 Claims. (Cl. 346—74)

This invention relates to a transducing system for the recording of an information signal such as a video signal on a recording medium such as a magnetic tape. More particularly, the invention relates to a system for obtaining a substantially uniform recording of information on a tape regardless of variations in the frequency of the information signals such as the video signals recorded on the tape. The invention especially relates to a system for varying the bias on a magnetic tape during the recording of information on the tape in accordance with variations in the frequency of the information signals recorded on the tape.

In the prior art, systems have been devised for recording high frequency information on a magnetic medium such as a tape and for obtaining a subsequent reproduction of the information from the medium. However, the prior art systems have suffered from a loss of efficiency at relatively high frequencies. The loss primarily results from several factors involved in the recording of the information. For example, the self-demagnetization of the magnetic particles on the tape increases at relatively high frequencies to produce a loss at these frequencies. The speed of the recording medium past the recording head may also affect the efficiency of recording information on the medium since changes in the speed of the medium are equivalent to changes in the frequency of the information signals. The combination of these factors produces a substantial loss in the strength of the signals recorded at relatively high frequencies on the medium so as to prevent a faithful reproduction of the information subsequently from the medium.

Systems have been devised in the past for facilitating the recording of information on a medium such as a magnetic tape at high frequencies without material losses in the efficiency of recording the information on the medium and subsequently reproducing the information from the medium. For example, a bias signal at a frequency considerably in excess of the information signal has been mixed with the information signal to facilitate the recording of the information signal on a medium such as a magnetic tape. The bias signal has been provided with such high frequencies so that any beat frequency signals between the bias signal and the information signal will not occur in the range of frequencies of the information signal. The bias signal has been provided with substantially constant characteristics such as a substantially constant amplitude regardless of variations in the frequency of the information signal. Although the use of such a bias signal has provided some improvement in the efficiency of recording information signals at relatively high frequencies on a medium such as a magnetic tape, considerable losses in efficiency have still resulted.

This invention provides a system for overcoming the disadvantages inherent in the systems of the prior art. As in the systems of the prior art, the system constituting this invention preferably uses a bias signal having a frequency considerably greater than the frequency of the information signal. However, the system constituting this invention detects changes in the frequency of the information signal and produces control pulses in accordance with such detected changes. The system constituting this invention then uses the control pulses to produce changes in the characteristics of the bias signal. For example, the amplitude of the bias signal is decreased in accordance with changes in the frequency of the information signal. By providing such changes in the amplitude of the bias signal, the information signal becomes recorded with considerable efficiency on the medium such as the tape regardless of changes in the frequency of the information signal.

In the drawings:

FIGURE 1 is a curve illustrating the response of a magnetic medium such as a tape with changes in the frequency of an information signal recorded on the medium;

FIGURE 2 provides a curve illustrating the response of the magnetic medium such as the tape to information signals of different amplitude and further illustrating the effect of a high frequency bias current in increasing the range of linear response of the medium;

FIGURE 3 illustrates two curves superimposed one on the other, the first curve showing the response of the recording system with changes in the amplitude of a bias current and the second curve showing distortions in the operation of the recording system with changes in the amplitude of the bias current;

FIGURE 4 illustrates the effect of the losses in a recording system of the prior art when an information signal containing high frequency content is modulated by a biasing signal;

FIGURE 5 is a curve illustrating variations produced in the amplitude of a bias signal by the system constituting this invention when changes occur in the frequency of an information signal, thereby providing a compensation for any loss in efficiency at relatively high frequencies;

FIGURE 6 illustrates a circuit diagram, partly in block form, of a system for varying the amplitude of the bias signal in a manner shown in FIGURE 5;

FIGURE 7 is a somewhat detailed circuit diagram of a balanced modulator shown in block form in FIGURE 6; and FIGURE 8 illustrates a series of signals (a) through (g) produced at different terminals in the system shown in FIGURES 6 and 7.

As is well known, information is presently being recorded on magnetic media such as tapes for storage and subsequent reproduction. The information may have variations in frequency such as may occur when variable video information is represented by changes in amplitude.

FIGURE 1 is a generalized curve illustrating the response of the recording system in recording information on the magnetic tape with changes in the frequency of the information signal. At relatively low frequencies, the curve is substantially flat, as indicated at 10 in FIGURE 1. This condition should theoretically continue indefinitely as the frequency increases. However, at relatively high information frequencies the efficiency of the recording system becomes progressively reduced, as indicated at 11 in FIGURE 1.

The decrease in the efficiency of recording information on a recording medium such as a tape at relatively high frequencies may be considered to result from the self-demagnetization of the tape at such frequencies. When the magnetic particles on the tape are subjected to a magnetizing force representing the information to be recorded on the tape, the degree of magnetization of the particles is the resultant of this force and the force produced by any free magnetic poles that exist in the particles. The force produced by the poles is in opposition to the applied magnetizing force, and when the applied force is removed, the effect of the poles is to demagnetize the particles. The free magnetic poles correspond to the self-demagnetizing force produced by the magnetic particles on the tape.

If the free magnetic poles are spaced far apart as they would be for long wavelengths or low frequency information signals, the effect of the demagnetization produced by the poles is not appreciable. If, however, the poles are spaced relatively close together as they would be for short wavelengths or high frequency signals, the effect of the demagnetization becomes significant. The effect of this self-demagnetization increases with increases in frequency and this partly produces the downward slope of the response curve of FIGURE 1 for the high frequency range of the information signals.

FIGURE 2 illustrates the effect of superimposing a high frequency bias signal of constant amplitude on the information signal to increase the range of linear response of the medium such as the tape. The frequency of the bias signal is usually considerably greater than the maximum frequency of the information signal. For example, when the information is representative of video information having a maximum frequency of approximately 1.75 megacycles per second, the bias frequency is in the range of 7 to 10 megacycles per second. The bias frequency is chosen to have a high value so that any beat frequency signals resulting from intermodulations between the bias signal and the information signal are above the range of frequencies of the information signal.

The purpose of providing the high frequency bias signal may be seen from the hysteresis curve generally indicated at 12 in FIGURE 2. This curve represents the response of the magnetic medium such as the tape to coercive forces of various magnitudes. As will be seen, the hysteresis curve 12 includes first linear portions 14 and 16 where the amount of magnetic flux recorded on the tape is directly proportional to changes in the coercive force applied to the tape. The hysteresis curve 12 also includes portions 18 and 20 where the amount of magnetic flux recorded on the tape hardly increases with progressive increases in the coercive force applied to the tape. The hysteresis curve 12 further includes portions 22 and 24 where the amount of magnetic flux recorded on the tape increases non-linearly with progressive increases in the coercive forces applied to the tape. By applying a high frequency bias signal 26, the linear range of response of the tape includes that indicated at 28 for positive coercive forces and that indicated at 30 for negative coercive forces. The bias signal is mixed with the information signal represented, for example, as a sine wave 32 to produce a recording signal as indicated at 34.

In recording systems now in use, high frequency bias signals are employed but the bias signals are provided with a substantially constant amplitude. Because of this, the signals are not effective in compensating for the non-linear response of the magnetic tape to information signals of relatively high frequencies. Actually, the high frequency bias signal may be considered to contribute to the distortion 11 upon the occurrence of high frequencies for the information signals since the bias signal tends to decrease the spacing between the free magnetic poles because of its amplitude swings.

FIGURE 3 shows the response of the recording system versus the bias current and also shows the distortion of the recording system versus the bias current. The distortion of the recording system is initially very high for low amplitude values of the bias signal. The distortion rapidly falls to a critical point marked ($a$) on the curve with a subsequet rise to a point marked ($b$) on the curve. Further increases of bias current produce decreased amounts of distortion until saturation of the magnetic material is reached. The response of the recording system initially has a low value for low amplitudes of bias current and subsequently rises to a maximum point marked ($c$) on the curve. The response then gradually decreases with increasing values of bias current.

Generally, the recording system is operated at a point beyond the point ($c$) on the response curve of FIGURE 3. For example, the recording system may be operated at a value of bias current marked as ($d$) on the graph. This value of bias current gives a sufficiently high response of the recording system with a correspondingly low distortion. Although it is feasible to operate the system with a low bias current corresponding to the point ($a$) on the distortion curve, this point is too critical to maintain with accuracy. Moreover, this invention is predicated on the normal operation of a recording system.

FIGURE 4($a$) shows a square wave representing information which is to be applied to the recording system. The square wave includes a large high frequency content when the square wave changes rapidly from one amplitude level to another, as illustrated at 40 and 42 in FIGURE 4($a$). A high frequency bias signal, as illustrated at 44 in FIGURE 4($b$), is to be added to the square wave. FIGURE 4($c$) shows the characteristic of the square wave biased by the high frequency biasing signal, the resultant wave being illustrated at 46. FIGURE 4($d$) illustrates a signal 48 as recorded on the medium.

It will be noted that, after recording, the bias signal no longer appears with the information signal. Since the bias frequency is very high, severe demagnetization takes place at the bias frequency. The resultant signal left on the recording medium is the difference between the positive and negative half-cycles of the bias wave, this difference being a function of the information. As explained with reference to FIGURES 1 and 2, the information when recorded on the magnetic medium suffers a loss in response at the high frequencies. This loss is illustrated in FIGURE 4($d$) by a rounding off of the square wave during the abrupt changes in the amplitude of the square wave.

FIGURE 5 provides a curve 50 illustrating the operation of the invention. The amplitude of the bias current is regulated so as to decrease with increases in the frequency of the information signal. As is illustrated in FIGURE 3 with reference to the portion of the curve to the right of point ($c$), it is seen that a decrease in the amplitude of the bias current produces a corresponding increase in the response of the recording system. The high frequency losses in the recording system with increases in the frequency of the information signal can be compensated by reducing the amplitude of the bias signal so as to increase the response of the recording system. This produces an essentially flat recording characteristic for all frequency values of the information.

FIGURE 6 illustrates a block diagram of a system for reducing the amplitude of the bias current upon an increase in frequency of the information signal. The information signal is applied to a differentiating network 110 which may be, for example, an RC circuit of a series capacitor followed by a resistor to ground. The information signal may be a square wave as illustrated at 150 in FIGURE 8($a$). The square wave is used to explain the operation of the system since it has very sharp changes in frequency during periods of amplitude change. Moreover, many information signals such as video signals also have abrupt changes in amplitude to represent different light intensities at successive positions on an image. These changes in amplitude may be considered to be produced by instantaneous changes in frequency. The operation of the system on the square wave 50 is, therefore, representative of the operation of the system on various types of information at relatively high frequencies, including video information.

The differentiating network 110 produces a pulse each time that the square wave 50 changes amplitude. This is illustrated by the pulses 152 and 154 shown in FIG- URE 8(b). This occurs because the ordinary RC differentiating circuit operates as a high-pass filter. Only the high frequencies which occur during the changes in amplitude of the square wave are passed by the network 110. Also, the amplitude of the output from the differentiating network is related to the frequency of the input to the network. Higher frequencies are passed with a smaller attenuation than lower frequencies due to the high-pass operation of the differentiating network. The amplitude of the pulses from the differentiating network are, therefore, proportional to the frequency of the input to the network.

The output from the differentiating network 110 passes through an amplifier 112 and is then applied through a transformer 113 to a full wave rectifier circuit 114. The full wave rectifier 114 converts all of the pulses into pulses of one polarity, as illustrated at 160 in FIGURE 8(c). The output from the rectifier 114 is produced across a potentiometer 116, and the output arm of the potentiometer 116 is adjusted to compensate for any unbalance in the full wave rectifier 114. The signal from the full wave rectifier may then be applied across a voltage divider 118 having a movable arm which may be adjusted to give the desired amplitude of signal to be applied to one input of a balanced modulator 120. The other input to the balanced modulator is from a bias oscillator 122 which has an output signal as shown at 162 in FIGURE 8(d). As previously described, the frequency of the biasing signal is preferably designed to be at least 4 to 6 times greater than the highest frequency of the information signal.

The output from the balanced modulator 120 is illustrated at 164 in FIGURE 8(e). It will be seen that the amplitude of the biasing signal is controlled by the input signal from the potentiometer 118. For the example shown in FIGURE 8, the amplitude of the biasing signal is decreased upon the appearance of the pulses 160 in the signal from the potentiometer 118. Since the pulses 160 represent the portions of the square wave which have a high frequency content, the biasing signal is, therefore, decreased in amplitude as illustrated at 166 in FIGURE 8(e) when the high frequency appears in the square wave.

The output from the balanced modulator 120 is applied to a summing network 124. The information signal 150 as shown in FIGURE 8(a) is also applied to the summing network 124 through a delay network 126 and the amplifier 128. The delay network 126 is adjusted to compensate for any delay produced by the differentiating network 110, the amplifier 112, the transformer 113, the full wave rectifier 114 and the balanced modulator 120. The output from the summing network 124 is illustrated at 170 in FIGURE 8(f).

The signal from the summing network 24 is then applied to a recording head 130 and recorded on the magnetic medium 132 as illustrated at 172 in FIGURE 8(g). The system of FIGURE 6 reduces the bias current proportionally with increases in frequency of the information signal. As illustrated in FIGURE 3, this reduction in bias current produced an increased response from the recording system with increases in frequency of the information signal to compensate for high frequency losses in the recording system. The recorded signal, as shown at 176 and 178 in FIGURE 8(g), reflects this compensation since the information signal 150 is recorded sharply with no rounding off of the corners. By recording the information signal 150 with sharp corners, the high frequency content of the information signal is preserved.

FIGURE 7 is a diagram of a circuit which may be used for the balanced modulator 20 included in the system of FIGURE 6. The bias oscillator 122, as shown in FIGURE 6, is connected to one terminal of the primary winding of a transformer 200, the other terminal of which is connected to a suitable reference potential such as ground. The output from the full wave rectifier 114, as shown in FIGURE 6, is applied through the voltage divider 118 to a center tap on the secondary winding of the transformer 200. The outer terminals of the secondary winding of the transformer 200 are connected to the control elements of a pair of current control members such as the grids of two balanced vacuum tubes 202 and 204.

The cathodes of the tubes 202 and 204 are at the reference potential such as ground. The plates of the tubes 102 and 104 respectively have common connections with the opposite terminals of the primary winding of an output transformer 206. A direct potential B+ is applied to the plates of the tubes 202 and 204 through a center tap along the primary winding of a transformer 206. The voltage produced across the secondary winding of the transformer 206 is introduced through a coupling capacitor 208 to the summing network 124, which is also shown in FIGURE 6.

When there is no input to the balanced modulator from the rectifier 114, the signal from the bias oscillator 122 passes through the balanced modulator 120 to the summing network 124 without any change. This results from the fact that the tubes 202 and 204 in the balanced modulator 120 operate as a push-pull amplifier with each tube amplifying either the positive half cycle or negative half cycle of the signal from the oscillator. However, a signal applied to the center tap of the secondary winding of the transformer 200 changes the operation of the balanced modulator 120. For example, with reference to FIGURE 8(c), when the pulses 160 are applied to the transformer 200, the grids of the tubes 202 and 204 become biased toward cut-off so as to reduce the output from each tube equally. This produces a signal from the balanced modulator as shown at 166 in FIGURE 8(e). Since the input pulses occur at the instants of high frequency content in the information signal, the biasing signal is accordingly decreased in amplitude at those instants.

Although the specification has been illustrated with reference to particular embodiments, the application is to be limited only by the scope of the appended claims.

What is claimed is:

1. In combination for use with a recording system for recording on a medium an information signal having a variable frequency and for compensating for the progressively decreasing response of the medium to progressively increasing frequencies of the information signal, first means responsive to the information signal for detecting the frequency of the information signal, second means operatively coupled to the first means for developing a control signal having characteristics in accordance with the frequency of the information signal, third means for developing a bias signal having a particular frequency, fourth means operatively coupled to the second means and responsive to the control signal for varying the characteristics of the bias signal in accordance with the characteristics of the control signal to compensate for the progressively decreasing response of the medium to progressively increasing frequencies of the information signal, fifth means operatively coupled to the fourth means and responsive to the information signal for mixing the information signal and the bias signal with the variable characteristics to obtain a resultant signal, and sixth means operatively coupled to the fifth means for obtaining a recording of the information signal on the medium.

2. In combination for use with a recording system for recording on a medium an information signal having a variable frequency and for compensating for the progressively decreasing response of the medium to progressively increasing frequencies of the information signal, first means responsive to the information signal for detecting any changes in frequency of the signal, second means operatively coupled to the first means for developing a control signal having characteristics in accordance with any change in the frequency of the information signal, third means for providing a bias signal having a particular frequency, fourth means operatively coupled to the second means and to the third means and responsive to the control signal and the bias signal for varying the amplitude of the bias signal in accordance with the characteristics of the control signal to decrease the amplitude of the bias signal as in the frequency of the information signal increases to compensate for the progressively decreasing response of the medium to progressively increasing frequencies of the information signal, fifth means operatively coupled to the fourth means and responsive to the information signal for mixing the information signal and the bias signal with the variable characteristics, and sixth means operatively coupled to the fifth means for obtaining a recording of the information signal on the medium.

3. In combination for use with a recording system for recording on a medium an information signal having a variable range of frequencies and having an alternating bias having a frequency greater than the maximum frequency included within the range of frequencies of the information signal to facilitate the efficiency of recording the information signal on the medium, first differentiating means responsive to the information signal for detecting the variations in frequency of the information signal, and second means operatively coupled to the first means and responsive to the variations in the frequency of the information signal for varying the amplitude of the alternating bias inversely to the variations in the frequency of the information signal to compensate for variations in the efficiency of the recording medium.

4. In combination for use with a recording system for recording on a medium an information signal having a variable frequency and having a bias to facilitate the efficiency of recording the information signal on the medium and for compensating for the progressively decreasing response of the medium to progressively increasing frequencies of the information signal, first differentiating means responsive to the information signal for detecting variations in the frequency of the information signal, second means operatively coupled to the first means for developing a control signal having variable characteristics in accordance with the detected variations in the frequency of the information signal, and third means operatively coupled to the second means and responsive to the control signal for varying the amplitude of the bias on the information signal in accordance with variations in the characteristics of the control signal to compensate for the progressively decreasing response of the medium to progressively increasing frequencies of the information signal.

5. In combination for use with a recording sysetm for recording on a medium an information signal having a variable frequency and having an alternating bias to facilitate the efficiency of recording the information signal on the medium, first differentiating means responsive to the information signal for detecting the frequency changes of the information signal, second means operatively coupled to the first means for developing a control signal having variable characteristics in accordance with the frequency changes of the information signal, and third balanced modulator means operatively coupled to the second means and responsive to the variable characteristics of the control signal for varying the amplitude of the bias on the information signal in accordance with the variable characteristics of the control signal.

References Cited by the Examiner

UNITED STATES PATENTS

| 2,876,294 | 3/1959 | Wissman | 179—100.2 |
| 3,084,224 | 4/1963 | Sanford | 179—100.2 |

IRVING L. SRAGOW, *Primary Examiner.*

M. K. KIRK, T. W. FEARS, *Examiners.*